(12) United States Patent
Schroeder

(10) Patent No.: US 7,029,621 B2
(45) Date of Patent: Apr. 18, 2006

(54) APPARATUS AND METHOD OF FABRICATING FIBER REINFORCED PLASTIC PARTS

(76) Inventor: Ernest C. Schroeder, 4234 Lovers La., Trappe, MD (US) 21673

( * ) Notice: Subject to any disclaimer, the term of this patent is extended or adjusted under 35 U.S.C. 154(b) by 194 days.

(21) Appl. No.: 10/084,998

(22) Filed: Mar. 1, 2002

(65) Prior Publication Data
US 2002/0121712 A1    Sep. 5, 2002

Related U.S. Application Data

(60) Provisional application No. 60/272,039, filed on Mar. 1, 2001.

(51) Int. Cl.
*B29C 35/10* (2006.01)

(52) U.S. Cl. ............... 264/477; 264/40.5; 264/40.7; 264/136; 264/308

(58) Field of Classification Search ............... 264/255, 264/308, 40.1, 136, 137, 477, 40.5, 40.7; 156/244.11
See application file for complete search history.

(56) References Cited

U.S. PATENT DOCUMENTS

| | | |
|---|---|---|
| 2,980,158 A | 4/1961 | Meyer |
| 3,616,070 A | 10/1971 | Lemelson |
| 3,645,829 A | 2/1972 | Palfreyman et al. |
| 3,708,132 A | 1/1973 | Lang |
| 4,137,354 A | 1/1979 | Mayes, Jr. et al. |
| 4,318,762 A | 3/1982 | Meyer |
| 4,352,769 A | 10/1982 | Meyer |
| 4,353,772 A | 10/1982 | Groeber |
| 4,735,667 A | 4/1988 | Johnston |
| 4,976,012 A | 12/1990 | McConnell |
| 5,121,329 A * | 6/1992 | Crump ...................... 700/119 |
| 5,183,598 A * | 2/1993 | Helle et al. .................. 264/401 |
| 5,296,335 A * | 3/1994 | Thomas et al. ............. 430/320 |
| 5,398,193 A | 3/1995 | deAngelis |
| 5,435,902 A * | 7/1995 | Andre, Sr. .................... 205/67 |
| 5,656,230 A * | 8/1997 | Khoshevis .................. 264/401 |
| 6,126,884 A | 10/2000 | Kerekes et al. |
| 6,129,872 A | 10/2000 | Jang |

* cited by examiner

*Primary Examiner*—Mark Eashoo
(74) *Attorney, Agent, or Firm*—John N. Coulby; Collier Shannon Scott, PLLC

(57) ABSTRACT

The invention relates to an apparatus and method for fabricating FRP parts. More specifically, the invention relates to a method for forming FRP parts without the use of forms or molds. According to a preferred embodiment of the present invention, the method for fabricating an FRP part comprises the steps of: programming a readable definition of a part into a machine, wherein the machine moves an extrusion head mounted to the machine in a controlled pattern; and wherein the machine regulates the speed of extrusion from the extrusion head; feeding a fiber reinforcement to the extrusion head of the machine; impregnating the fiber reinforcement with a radiation-initiated resin; extruding the impregnated fiber reinforcement from an orifice in the extrusion head; and exposing the extruded fiber reinforcement to curing radiation.

6 Claims, 6 Drawing Sheets

APPARATUS AND METHOD OF FABRICATING FIBER REINFORCED PLASTIC PARTS

CROSS-REFERENCE TO RELATED APPLICATIONS

The present invention relates to, and is entitled to the benefit of the earlier filing date and priority of, U.S. Provisional Application No. 60/272,039, filed on Mar. 1, 2001.

FIELD OF THE INVENTION

The invention relates to an apparatus and method for fabricating fiber reinforced plastic parts. More specifically, the invention relates to an apparatus and method for forming fiber reinforced plastic ("FRP") parts without the need for forms or molds.

BACKGROUND OF THE INVENTION

The use of fiber (primarily glass fiber) reinforced plastic ("FRP") parts is widespread in many industries, including manufacturing, marine, aerospace, transportation, or any industry demanding molded, durable high strength, parts. FRP is a standard and understood name for fiberglass parts in the field of art and includes reinforcement materials other than fiberglass. Typically these parts must be made using expensive forms or molds. What is needed in the industry is an apparatus and method for the fabrication of FRP parts without the use of forms or molds.

There are previously known methods relating to the construction and operation of computer controlled machine tools ("computer numerically controlled machines" or "CNC machines") for metal working, painting, welding, woodworking and assembly. There are previously known radiation-initiated resins used in making prototype parts within a liquid bath ("rapid prototyping"). There is also related art referring to the application of resin (some radiation-initiated) impregnated yarns (tow) or ribbons of reinforcements to rotating mandrels of given shapes to form parts on those mandrels ("filament winding"). In addition, there are applications where radiation-initiated resin impregnated reinforcements are deposited on two- and three-dimensional mold surfaces by CNC machines. This pultrusion process pulls an FRP shape out of a die, and radiation-initiated resins are used to allow for the bending of the shape as it emerges from the die. Applicant is unaware of any work preceding that of the present invention that describes an apparatus and method enabling the use of a CNC machine to make FRP parts, without the use of forms or molds in practically any size or shape, according to a preferred embodiment of the present invention.

The apparatus and method according to a preferred embodiment of the present invention represents a more economical process to create these FRP parts. The following example provides some idea of the value of the apparatus and method.

A boat hull requires the following steps to proceed from drawing to finished product using processors according to the prior art: 1) build forms to make a 'plug' or mock up of the hull; 2) fair up and smooth the plug to final dimension and finish (a CNC machine is typically used for this step); 3) laminate a female mold over the plug; and 4) laminate a complete hull in the mold.

Using current technology, the probable cost for a 45 foot hull could easily exceed $500,000.00 and require 6 months to complete depending upon the degree of accuracy and finish desired.

The same hull created by the apparatus and method according to a preferred embodiment of the present invention would require the following steps: 1) operate the novel extrusion system of the present invention for a period long enough to make the desired shape; 2) smooth the surface; and 3) build up thickness on the inside of the hull.

It is probable that this work could cost less than $30,000.00 and require no more than 1 month to complete for a 45 foot boat hull, and the finished product could be reasonably expected to be as, or more, geometrically exact than the product of the prior art process. Additionally, the novel process according to an embodiment of the present invention would provide more consistently accurate results because of the elimination of steps between the CNC machine work and the finished part.

There is no process known to exist that can create a large FRP shape in space that is dimensionally accurate, and possesses structural integrity. All of the materials used to make this FRP laminate become a contributing functional part of the finished structure and are compatible with materials used in secondary operations to increase strength through build-up of thickness on the inside of the structure or for attaching components.

OBJECTS OF THE INVENTION

It is an object of a preferred embodiment of the present invention to provide a fast, cost-effective apparatus and method for fabricating FRP parts directly from computer drawing data without the need for costly molds or other intermediate forming tools.

It is another of a preferred embodiment of the present invention to provide a method for fabricating FRP parts that avoids the costs of traditional molds, such as mold maintenance, mold storage, and security.

It is another object of a preferred embodiment of the present invention to provide an apparatus and method for developing a FRP laminated shape that is self-supporting and inherently strong without part-specific tooling.

It is another object of a preferred embodiment of the present invention to provide an apparatus and method for fabricating FRP laminated composite structures directly from digital data.

Additional objects and advantages of the invention are set forth, in part, in the description which follows and, in part, will be apparent to one of ordinary skill in the art from the description and/or from the practice of the invention.

SUMMARY OF THE INVENTION

In response to the foregoing challenge, applicants have developed an apparatus for fabricating a fiber reinforced plastic part (FRP), comprising: an extrusion head, wherein the extrusion head further comprises an orifice through which resin impregnated fiber reinforcement can be delivered in a speed regulated manner; means for moving the head in a controlled pattern; means for regulating the speed of extrusion from the extrusion head; a resin impregnator; a supply of fiber reinforcement, wherein the fiber reinforcement passes through the impregnator and through the extrusion head; a supply of radiation-initiated resin for impregnating the fiber reinforcement; means for feeding the fiber reinforcement through the impregnation and through the extrusion head; means for impregnating the fiber reinforcement with the resin; a resin-curing radiation source; and a readable definition of the part.

The resin impregnator may be part of the extrusion head or located upstream of the fusion head on the path of the fiber reinforcement. The means for moving the head in a controlled pattern may comprise a computer numerically controlled machine, a mechanically guided machine, or any other suitable device capable of moving the head in a controlled pattern. The means for regulating the speed of extrusion from the extrusion head may comprise a computer numerically controlled machine, a mechanically guided machine, or any other suitable device capable of regulating the speed of extrusion from the extrusion head.

The fiber reinforcement may comprise a yarn (tow), ribbon, tube, or any other suitable shape. The radiation-initiated resin may cure (harden) with exposure to a resin-curing radiation source. The radiation source may comprise any radiation at any wavelength or energy level effective in curing the resin. The radiation source may further comprise ultraviolet light in a wavelength range between about 380 and 400 nanometers and at about 400 to 1000 watts of ultraviolet light. The apparatus may further comprise means for directing the radiation to the un-cured fiber reinforcement as it exits the orifice of the extrusion head. The means for directing the radiation may further comprise a lens and mirror for directing the radiation source to the extruding fiber reinforcement.

The means for feeding the fiber reinforcement to the extrusion head may comprise one or more of a supply roller, a tensioner, and/or a roller pair located within the extrusion head, or alternatively upstream along the reinforcement supply path. The means for impregnating the fiber reinforcement with the resin may comprise a resin supply line leading to the impregnator and a pump, or any other suitable means for impregnating the fiber reinforcement. The readable definition of the part may comprise a mechanical definition of the part, or alternatively a computer-generated definition of the part.

The apparatus may further comprise means for spraying the fabricated part with surfacing materials. The apparatus may further comprise means for cutting or abrading the part back to the final dimensions of the original readable definition of the part.

According to an alternative embodiment of the present invention, the apparatus for fabricating a fiber reinforced plastic part comprises: an extrusion head, wherein said extrusion head further comprises an orifice; a computer numerically controlled machine to which said extrusion head is mounted; a resin impregnator; a supply of fiber reinforcement, wherein said fiber reinforcement passes through said impregnator and through said extrusion head; a supply of radiation-initiated resin for impregnating said fiber reinforcement; means for feeding said fiber reinforcement to said extrusion head; means for impregnating the fiber reinforcement with the resin; a resin-curing radiation source; and a readable definition of said part.

Another alternative embodiment of the apparatus for fabricating a fiber reinforced plastic part comprises: an extrusion head, wherein the extrusion head further comprises an orifice; a mechanically guided machine to which the extrusion head is mounted; a resin impregnator; a supply of fiber reinforcement, wherein the fiber reinforcement passes through the impregnator and through the orifice of the extrusion head; a supply of radiation-initiated resin for impregnating the fiber reinforcement; means for feeding the fiber reinforcement to the extrusion head; means for feeding the resin to the impregnator; a resin-curing radiation source; and a readable definition of the part.

Applicants have also developed an innovative, economical method to extrude a shape of fiber reinforcement, which is impregnated with a radiation-initiated resin, and to cause the radiation-initiated resin impregnated fiber reinforcement to cure nearly instantly in place by means of exposure to radiated energy, which may be a focused beam of light or any other suitable curing radiation. According to a preferred embodiment, the method for fabricating a fiber reinforced plastic part comprises the steps of: programming a readable definition of a part into a machine, wherein the machine moves an extrusion head mounted to the machine in a controlled pattern; and wherein the machine regulates the speed of extrusion from the extrusion head; feeding a fiber reinforcement to the extrusion head of the machine; impregnating the fiber reinforcement with the resin; extruding the impregnated fiber reinforcement from an orifice in the extrusion head; exposing the extruded fiber reinforcement to curing radiation; and, if necessary, repeating the passes of the extrusion head to develop a fiber reinforced plastic part.

The step of extruding the fiber reinforcement may comprise extruding the impregnated fiber reinforcement at a speed consistent to the speed of travel of the extrusion head. The step of extruding the fiber reinforcement may further comprise moving the extrusion head with the machine along a path that defines the surface of the part. The step of extruding the fiber reinforcement may further comprise extruding a plurality of points of attachment to a base or support structure at intervals during the extrusion.

The step of exposing the extruded fiber reinforcement to curing radiation may further comprise coordinating the rate of cure with the rate of travel of the extrusion head and the rate of extrusion of the fiber reinforcement, thereby maintaining the fiber reinforcement in position at the point of extrusion. The step of extruding the fiber reinforcement may further comprise the step of rotating the extrusion head, which is mounted to an arm of the machine, and free-forming the shape of extruding fiber reinforcement onto a take-away belt.

The method may further comprise the steps of: spraying the laminated part with surfacing materials; and cutting or abrading the sprayed part back to the final dimensions of the original definition of the part.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and together with the detailed description serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

DETAILED DESCRIPTION OF THE PREFERRED EMBODIMENTS

Apparatus of the Present Invention

Reference will now be made in detail to a preferred embodiment of the present invention. The apparatus for fabricating fiber reinforced plastic parts comprises: an extrusion head, wherein the extrusion head further comprises an orifice; means for moving the head in a controlled pattern; means for regulating the speed of extrusion from the extrusion head; a resin impregnator; a supply of fiber reinforcement, wherein the fiber reinforcement passes through the impregnator and through the extrusion head; a supply of resin for impregnating the fiber reinforcement; means for feeding the fiber reinforcement to the extrusion head; means for impregnating the fiber reinforcement with the resin; a resin-curing radiation source; and a readable definition of the part.

Figure 1A:
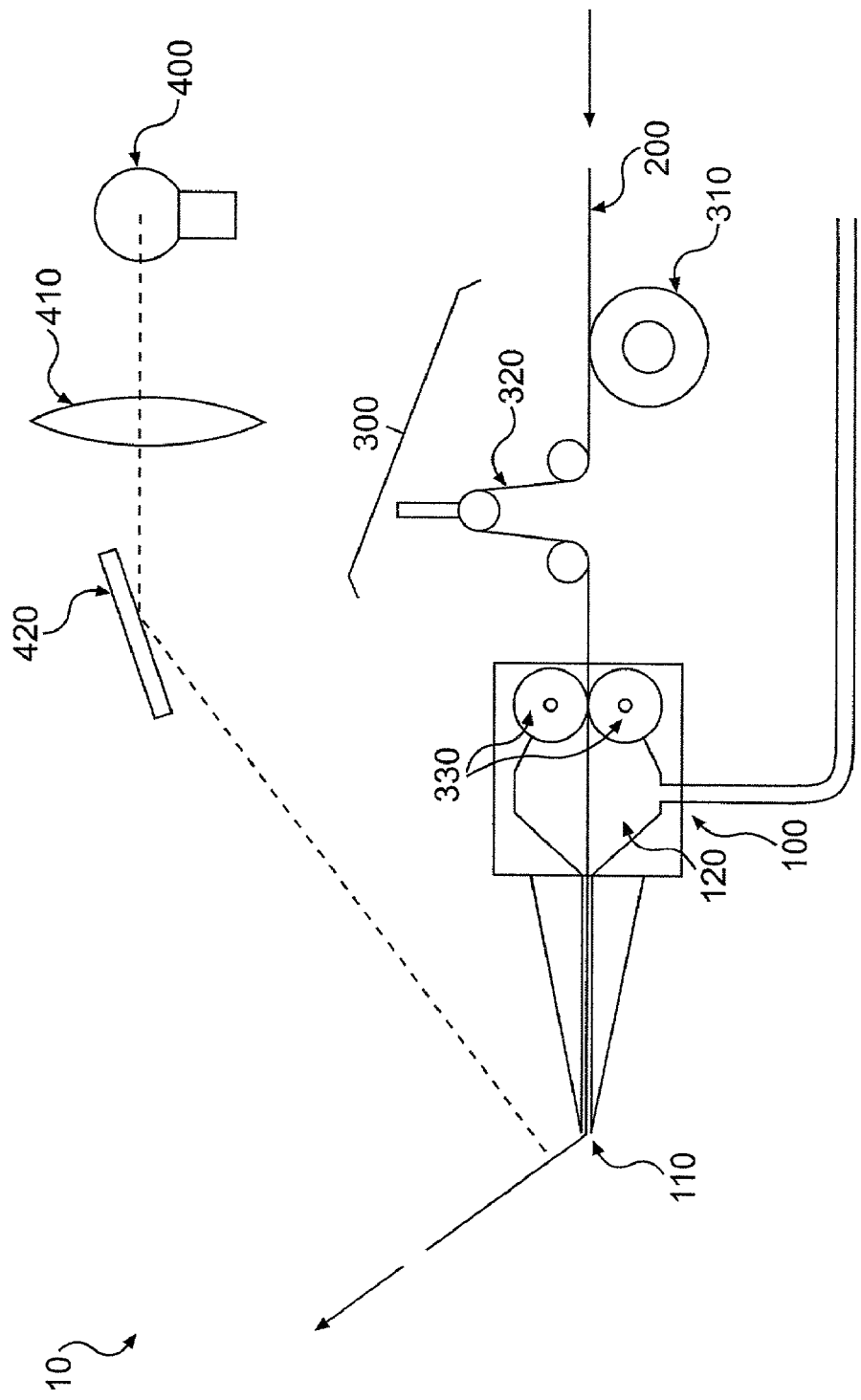
FIG. 1a is a schematic view of an extrusion head of the apparatus for fabricating fiber reinforced plastic parts according to a preferred embodiment of the present invention.

A preferred embodiment of the apparatus 10 is shown in FIG. 1a. According to the preferred embodiment, an extrusion head 100 has an orifice 110 located therein through which resin impregnated fiber reinforcement can be delivered in a speed regulated manner. The apparatus 10 preferably includes means for moving the head in a controlled pattern and means for regulating the speed of extrusion from the extrusion head. The means for moving the head in a controlled pattern and the means for regulating the speed of extrusion preferably comprise a CNC machine. The CNC machine preferably is of a size and with sufficient number of axis of movement to form the part. The extrusion head may be mounted to the CNC machine. Although the preferred embodiment discusses a CNC machine, any other suitable machine or mechanism may be used.

According to the preferred embodiment, the rate at which the extruding fiber reinforcement issues from the head 100 matches the rate at which the head 100 moves through space. If the head 100 moves faster than the rate of extrusion, the extruded reinforcement may be stretched out of position and the final structure may be distorted. If the head 100 moves slower, the extruded reinforcement may be bunched, causing distortion.

The apparatus 100 preferably further includes a resin impregnator 120. A supply of fiber reinforcement 200 preferably is further included, wherein the fiber reinforcement 200 passes through the impregnator 120 and through the orifice 110 of the extrusion head 100. The fiber reinforcement 200 may comprise various shapes, such as, but not limited to, a yarn, ribbon, or tube. Several possible cross sections in combination of the fiber reinforcement are depicted in FIGS. 2a–2d. The resin impregnator 120 may comprise a chamber within the extrusion head 100. Alternatively, the resin impregnator 120 may be located upstream on the supply path of the fiber reinforcement 200.

The apparatus preferably includes a supply of resin for impregnating the fiber reinforcement 200. The resin used to impregnate the reinforcement 200 may be a commercially available polymer to which has been added a radiation-initiator causing the resin to cure with exposure to curing radiation, such as but not limited to ultraviolet ("UV") light.

Figure 1B:
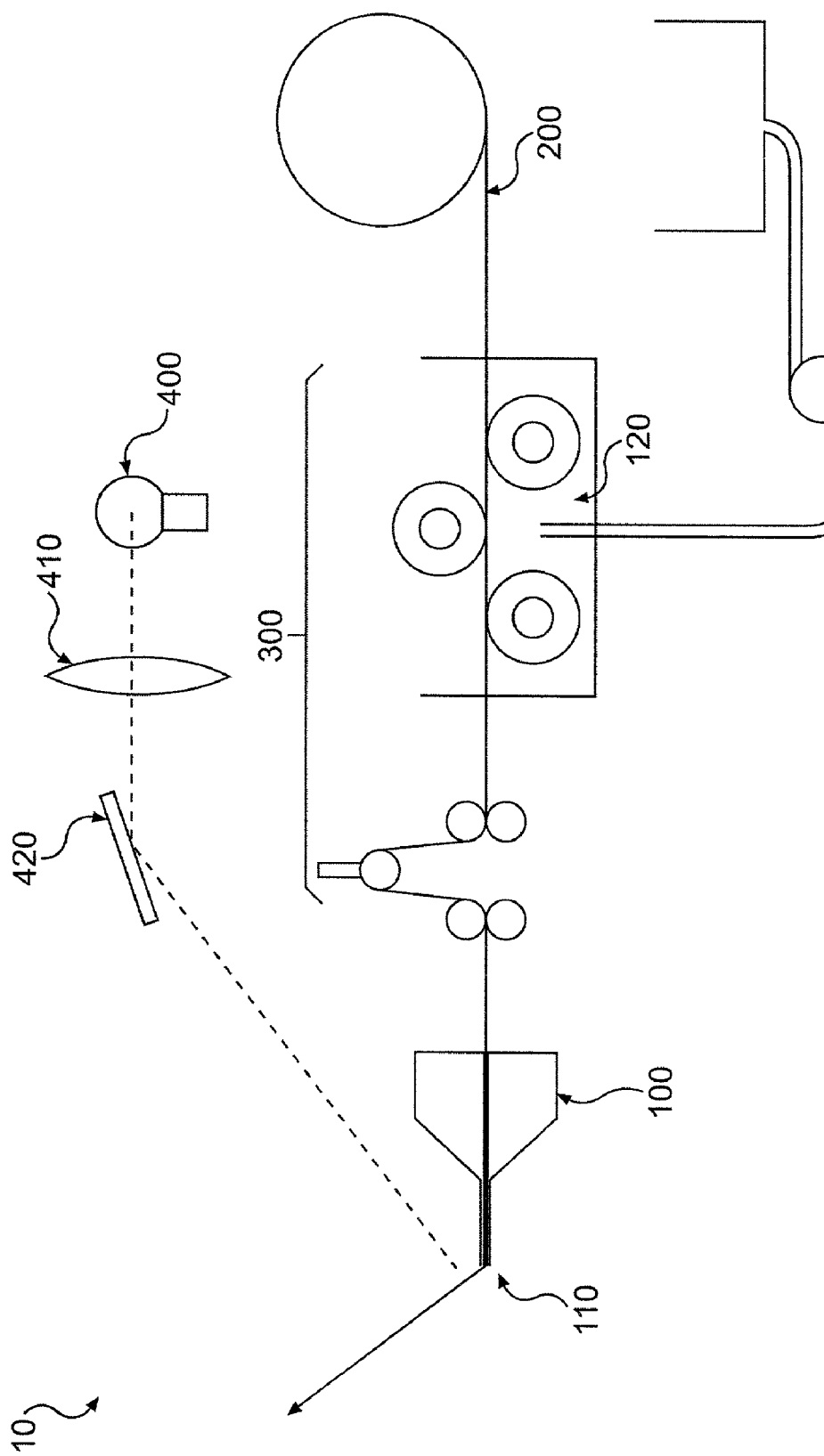
FIG. 1b is a schematic view of an extrusion head of the apparatus for fabricating fiber reinforced plastic parts according to an alternative embodiment of the present invention.

According to the preferred embodiment, the apparatus 10 further comprises, means for feeding the fiber reinforcement to the extrusion head and means for impregnating the fiber reinforcement with a resin. The fiber reinforcement 200 preferably is fed through the resin impregnator 120 and out through the orifice 110 of the extrusion head 100. As shown in FIG. 1a, the means for feeding the fiber reinforcement to the extrusion head 300 may comprise one or more of a supply roller 310 and/or a tensioner 320. These components may be located anywhere between the extrusion head 100 and the source of the fiber reinforcement. The means for feeding the fiber reinforcement to the extrusion head 300 may further include a roller pair 330, which may be located within the extrusion head 100. The roller pair may seal the resin impregnator while controlling the rate of feed of the fiber reinforcement as the pressure within impregnator 120 forces the fiber reinforcement out through the orifice 110. The fiber reinforcement 200 may be fed by the supply roller 310 through the tensioner 320 and into the head 100 where it may be fed between the roller pair 330, through the resin impregnator 120, and to the orifice 110 of the extrusion head 100. Alternatively, as shown in FIG. 1b, a roller group may be located within the impregnator and the tensioner may be located anywhere between the impregnator and the orifice of the extrusion head. The means for impregnating the fiber reinforcement with the resin may comprise a resin supply line, such as for example a supply tube, which leads from the resin supply source to the impregnator 120 of the extrusion head 100, and a pump or any other suitable means to supply resin to impregnator 120.

It will be apparent to persons of ordinary skill in the art that various modifications and variations could be made to the means for feeding the fiber reinforcement through the machine. It may comprise any suitable mechanism for advancing the fiber reinforcement through the required components. Thus it is intended that the present invention cover all the variations and modifications of various machines that could be employed, provided they come within the scope of the present invention as claimed in the appended claims and their equivalents.

The radiation source 400 preferably is of sufficient intensity and wavelength to cause the extruded material to cure upon emergence from the extrusion head 100. The radiation may comprise UV light in a wavelength range of from about 380 to 400 nm. It may further comprise an intense source of about 400 to 1000 watts of UV light at such wavelengths. The radiation may shine from a source directly onto the emerging fiber reinforcement. Alternatively, the apparatus 10 may further comprise means for directing the radiation to the un-cured fiber reinforcement 200 as it exits the orifice 110 of the extrusion head 100. The means for directing the radiation may include a lens 410 and/or a mirror 420, as depicted in FIG. 1a, which concentrate and direct the radiation to the extruding fiber reinforcement for curing the reinforcement 200. The means for directing the radiation may comprise other devices, such as, but not limited to, magnets, wave-guides, or any other suitable device capable of concentrating and directing the radiation.

In a preferred embodiment, a readable definition of the part to be fabricated is programmed into the CNC machine, to and is used by the machine to direct the extrusion of the impregnated fiber reinforcement. The readable definition of the part may comprise a a computer-generated definition of the part, or alternatively a mechanical definition of the part. Software and technology needed for programming the design into the machine is well within the ability of one of ordinary skill in the art. It is standard practice to use commercially available CAD (Computer Assisted Design) and CAM (Computer Assisted Manufacturing) software.

In an alternative embodiment of the present invention, commonly available software and materials may also be included so that the same machine that controls the extrusion head may be used to spray the structure with surfacing materials by means of mounting a standard spray gun to the CNC machine and controlling its path while applying a given thickness of commercially available surfacing putty or paint to the FRP part. After the surfacing material has been applied and allowed to cure, the spray gun may be replaced by a router or sanding head and the surfacing material may be removed in a controlled manner to a depth to yield a smooth accurate surface representing the original surface as defined in the readable definition of the part, such as computer data.

Any CNC machine designed for cutting will have the necessary rigidity to accomplish this cutting work efficiently. If, however, the CNC machine will only be applying the impregnated fiber reinforcement, then the CNC machine can be of less rigid construction because the application of the impregnated fiber reinforcement does not result in back pressure against the CNC machine. Lightly built CNC machines currently available for other processes that do not result in back pressure would include welding and spray painting robots, for example. More rigidly built CNC machines currently available for other processes that do result in back pressure would include metal cutting milling machines and woodworking CNC routers. It is conceivable that a hand-held device could be developed that would allow the fabrication of non-dimensionally critical structures if the speed of travel of the head could be determined and linked to control the rate of extrusion. This development would allow for physical structures to be "drawn" in three-dimensional space.

It will be apparent to persons of ordinary skill in the art that various modifications and variations could be made to the apparatus of the present invention without departing from the scope or spirit of the invention. For example, the means for moving the head in a controlled pattern and the means for regulating the speed of extrusion of the fiber reinforcement that are employed in the present invention could be modified. Rather than a CNC machine, each may comprise a numerically controlled machine, a direct numerically controlled machine, a mechanically guided machine, or any other suitable device that is capable of performing such functions. In an application for repetitive small parts the head may be moved by a mechanism that follows a template, thereby eliminating the need for a CNC machine. In addition, the curing radiation could be any radiation type, known or unknown, for example, but not limited to, light such as used with photo-initiator resins. Thus it is intended that the present invention cover all the variations and modifications of various machines that could be employed, provided they come within the scope of the present invention as claimed in the appended claims and their equivalents.

Method of the Present Invention

Figure 3:
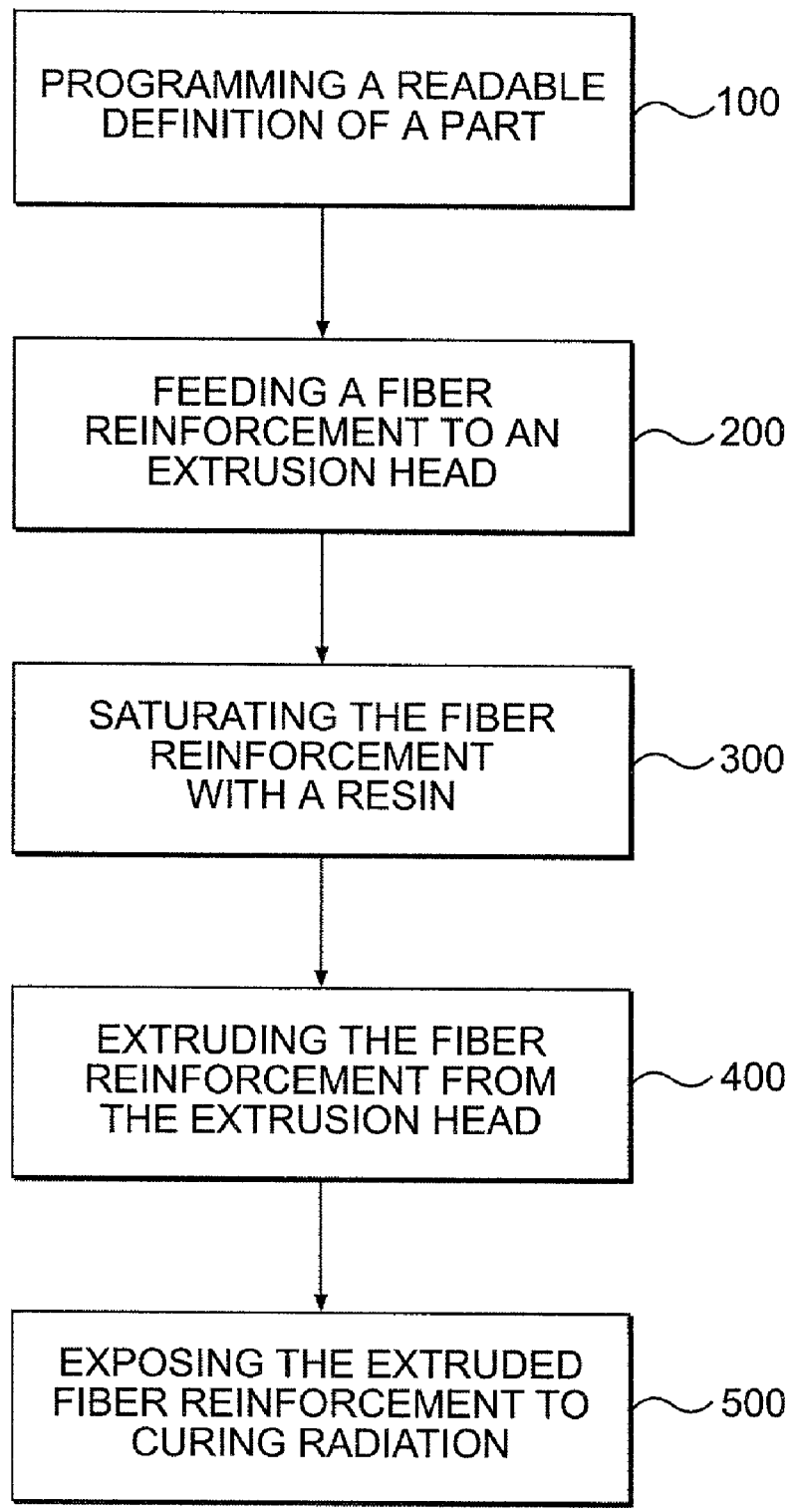
FIG. 3 is a flowchart depicting the method according to a preferred embodiment of the present invention for fabricating FRP parts.
Figure 4:
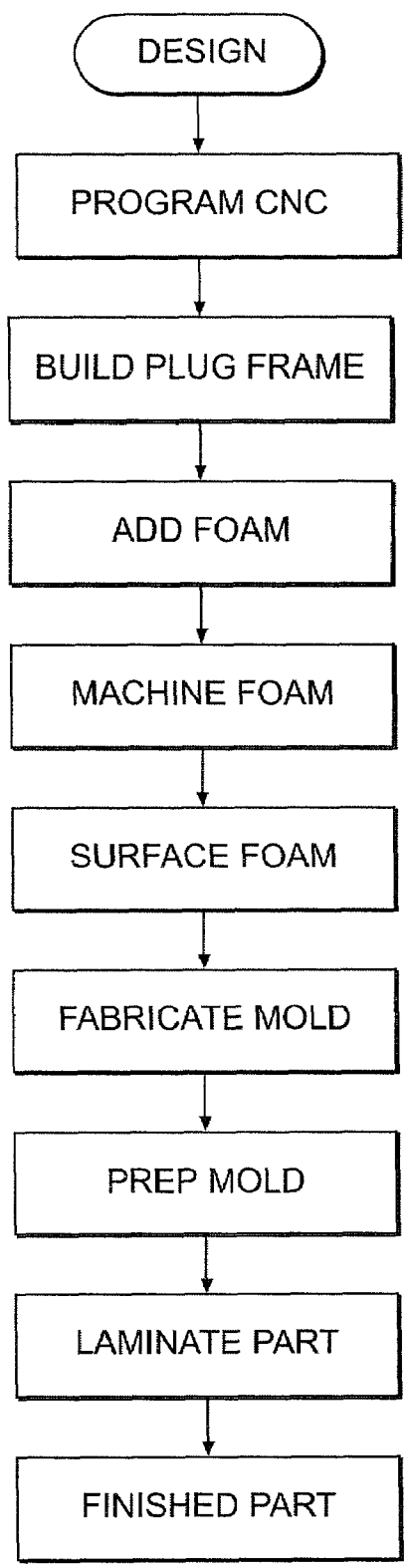
FIG. 4 is a flowchart depicting a process according to the prior art.
Figure 5:
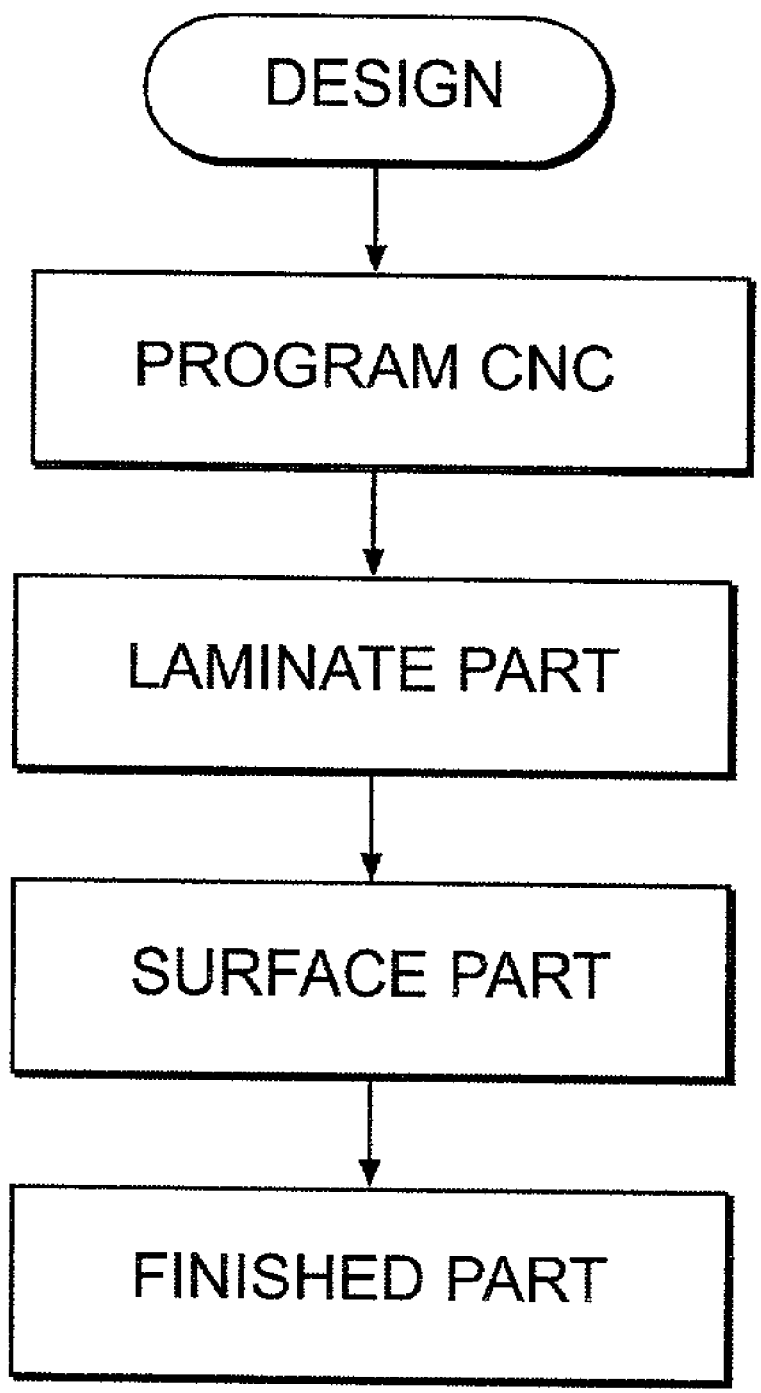
FIG. 5 is a flowchart according to an alternative embodiment of the present invention.

Reference will now be made in detail to the method of a preferred embodiment of the present invention. According to a preferred embodiment, as depicted in FIG. 3, the method for fabricating a fiber reinforced plastic part comprises the steps of: programming a definition of a part into a machine, wherein the machine moves an extrusion head mounted to the machine in a controlled pattern and wherein the machine regulates the speed of extrusion from the extrusion head; feeding fiber reinforcement to an extrusion head of the machine; impregnating the fiber reinforcement with a radiation-initiated resin; extruding the fiber reinforcement from an orifice in the extrusion head; exposing the extruded fiber reinforcement to curing radiation; and, if necessary, repeating the passes of the extrusion head to develop a fiber reinforced plastic part.

A machine readable design of the FRP part to be fabricated preferably is developed and programmed into the machine, as shown in step 100. One of ordinary skill in the art would be familiar with suitable software and technology for use in the machine, preferably a CNC machine. In step 200, fiber reinforcement preferably is delivered to the extrusion head of the machine by the means for feeding the reinforcement to the extrusion head. The fiber reinforcement preferably is fed through a resin impregnator and out through the orifice in the extrusion head. The fiber reinforcement may be fed by one or more of a supply roller, through one or more of a tensioner, and into the extrusion head, where it may be fed by one or more of a roller pair within the head into the resin impregnator.

In step 300, the fiber reinforcement is impregnated by a radiation-initiated resin. The resin preferably is fed through a resin supply to the resin impregnator where it impregnates the fiber reinforcement as it is fed through the impregnator. In a preferred embodiment depicted in FIG. 1a, a strand, ribbon, tube, rod, or any other suitable shape of fiber reinforcement is fed into the impregnator in the extrusion head by means of a roller pair. Within the impregnator, the fiber reinforcement preferably is impregnated by the resin, which is delivered to the impregnator by a pump, or any other suitable means of delivery.

As shown in step 400, the impregnated fiber reinforcement preferably is extruded through the orifice of the extrusion head. It may be forced from the head by the resin pressure and the force of the roller pair. In a preferred embodiment, the machine moves the extrusion head in a defined path in space, which causes the extruded reinforcement to form the final shape, as called for by the readable definition of the part. The extrusion head preferably is moved along a path that defines the surface of the part to be formed. Software and technology for this kind of control is common and accessible from the industry and would be known by one of ordinary skill in the art. The extrusion head preferably extrudes impregnated fiber reinforcement at a speed consistent to the speed of travel of the machine that carries it.

The rate of travel of the head and the rate of extrusion of the fiber reinforcement preferably are coordinated with the rate of cure of the resin, step 500, so that the material remains in position at the point of extrusion, supported only by its own rigidity and by the previously extruded material adjacent to it (the fiber reinforcement laid down in the previous pass). It is preferable that no loads are placed on existing extruded structure as distortion could result.

In an alternative embodiment, the part being formed may have a plurality of points of attachment to a pre-existing base plate or support structure, as required, which may be extruded at intervals during the process.

In another alternative embodiment, the step of extruding the fiber reinforcement may include a rotating extrusion head, which is mounted to an arm of a CNC machine, and free-forming the shape of extruding fiber reinforcement onto a take-away belt.

In step 500, curing radiation, preferably UV light, hardens successive passes of the extruded material in space as it is extruded. The resulting material preferably forms a shell or structure in the desired shape and of the desired thickness. The surface finish of the completed part will be as smooth as the size of the extruded ribbon or strand used to make it will allow. For example, a part made from ⅛ inch diameter material may have a rougher surface than a part made from 1/16 inch diameter material. The "macro" dimensions of a part made by this method, however, will be as accurate as the precision built into the controlling machine and readable definition of the part. All of the materials used to fabricate the FRP part preferably are compatible with materials used in secondary operations to increase strength through build-up of thickness on the inside of the structure or for attaching components.

Figure 2A:
FIGS. 2a–2d are illustrations of various extruded cross sections of an FRP structure combined by successive passes of the means for moving the head in a controlled pattern and the means for regulating the speed of extrusion from the extrusion head according to preferred embodiments of the present invention.
Figure 2B:
Figure 2C:
Figure 2D:
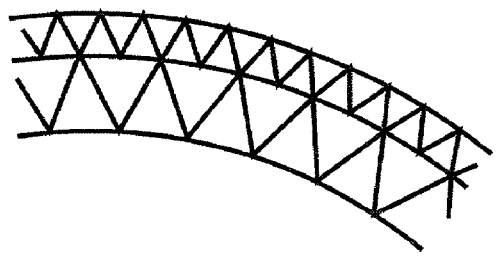

The ability to extrude a variety of shapes, as depicted in FIGS. 2a–2d, allows large simple shapes, such as boat hulls, to be made with flat ribbons to save time, whereas intricate shapes may require small rods with diameters of a fraction of an inch, as in FIG. 2a, to achieve the necessary level of detail. It is also possible to extrude cruciform or channel shapes, as shown in FIG. 2c, in which the projecting rib adds stiffness to the structure. Alternatively, a multi-level structure that is bonded by supporting members may be made to create very high strength-to-weight ratios, as depicted in FIG. 2d. Applications of preferred embodiments of the present invention include: prototype fabrication of any large FRP structure (such as boat hulls, airplane parts, automotive components, tanks, and ducting); scenery and full-size sets for film, display and entertainment applications; and onsite fabrication of structures, including housing structures, by means of purpose built application equipment, such as, for example a truck mounted CNC machine arm.

It may be found practicable and efficient to build a "wire frame"-type structure with rapid cure materials using the method of the present invention, and then apply traditional chemical cure layers to build up thickness and strength. Typical tolerances for large CNC machine cut foam shapes are +/−0.060" for aerospace applications and +/−0.250" for marine applications. CNC machine produced parts are about this accurate over the full size of the part. To get this accuracy by hand is possible, but not probable or cost effective. In most applications, the tolerances required on large FRP structures can be much less stringent. Tolerance may become critical in applications where two large parts have to fit together. For example two halves of a large aircraft fuel tank. If the producing CNC machine is not large enough to make the whole part in one piece, or if transportation restrictions demand a multi-section structure, then a high degree of accuracy becomes critical.

In addition, it may be cost effective to fabricate any size of finished production FRP parts in quantity without tooling in many different applications, especially where surface finish is not critical and/or shape changes need to be accommodated on short notice. The present invention avoids the costs of traditional molds, such as mold maintenance, mold storage, and security. For example, if molds are destroyed, the only recourse is to start from scratch and replace them. With this method, the readable definitions of the parts can be duplicated and securely stored. It also enables users to make parts at more than one location that are exactly the same dimensions.

It will be apparent to those skilled in the art that various modifications and variations can be made in the construction, configuration, and/or operation of the present invention without departing from the scope or spirit of the invention. For example, in the embodiments mentioned above, various changes may be made to the resin, curing method, or machine parts without departing from the scope and spirit of the invention. Further, it may be appropriate to make additional modifications or changes to the resin delivery method without departing from the scope of the invention. Thus, it is intended that the present invention cover the modifications and variations of the invention provided they come within the scope of the appended claims and their equivalent

I claim:

1. A method for fabricating a fiber reinforced plastic part, comprising the steps of:
    programming a readable definition of a part into a machine,
    wherein the machine moves an extrusion head mounted to the machine in a controlled pattern; and
    wherein the machine regulates the speed of extrusion from the extrusion head;
    feeding a fiber reinforcement to the extrusion head of the machine;
    impregnating the fiber reinforcement with a radiation-initiated resin;
    extruding the impregnated fiber reinforcement from an orifice in the extrusion head; and
  exposing the extruded fiber reinforcement to curing radiation which hardens the extruded impregnated fiber reinforcement as the impregnated fiber reinforcement is extruded, wherein the step of exposing the extruded fiber reinforcement to curing radiation further comprises coordinating the rate of cure with the rate of travel of the extrusion head and the rate of extrusion of the fiber reinforcement, thereby maintaining the fiber reinforcement in a final shape as called for by the readable definition of the part at the point of extrusion.

2. The method according to claim 1, wherein the step of extruding the fiber reinforcement comprises extruding the impregnated fiber reinforcement at a speed consistent to the speed of travel of the extrusion head.

3. The method according to claim 1, wherein the step of extruding the fiber reinforcement further comprises moving the extrusion head with the machine along a path that defines the surface of the part.

4. The method according to claim 1, wherein the step of extruding the fiber reinforcement further comprises extruding a plurality of points of attachment to a base or support structure at intervals during the extrusion.

5. The method according to claim 1, wherein the step of extruding the fiber reinforcement further comprises the step of rotating the extrusion head, which is mounted to an arm of the machine, and free-forming the shape of extruding fiber reinforcement onto a take-away belt.

6. The method according to claim 1, further comprising the steps of:
    spraying the extruded impregnated fiber reinforcement with surfacing materials; and
    cutting or abrading the sprayed part back to the final dimensions of the original definition of the part.

* * * * *